(12) United States Patent
Marupaduga (10) Patent No.: US 11,968,554 B1
(45) Date of Patent: Apr. 23, 2024

(54) DYNAMIC ADJUSTMENT OF CHANNEL STATE INFORMATION REPORTING PROTOCOL

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

(*) Notice: Subject to any disclaimer, the term of this patent is extended or adjusted under 35 U.S.C. 154(b) by 143 days.

(21) Appl. No.: 16/916,947

(22) Filed: Jun. 30, 2020

(51) Int. Cl.
*H04W 24/10* (2009.01)
*H04B 17/318* (2015.01)
*H04W 24/08* (2009.01)
*H04W 88/04* (2009.01)
*H04W 88/06* (2009.01)

(52) U.S. Cl.
CPC .......... *H04W 24/10* (2013.01); *H04B 17/318* (2015.01); *H04W 24/08* (2013.01); *H04W 88/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 8,559,328 B2 | 10/2013 | Tan et al. | |
| 9,001,747 B2 | 4/2015 | Ojala et al. | |
| 10,321,334 B1* | 6/2019 | Marupaduga | H04B 7/0617 |
| 10,608,708 B2 | 3/2020 | Park et al. | |
| 11,653,239 B1* | 5/2023 | Marupaduga | H04W 52/241 370/252 |
| 2015/0117360 A1* | 4/2015 | Shen | H04W 52/38 370/329 |
| 2016/0143055 A1* | 5/2016 | Nammi | H01Q 21/28 370/329 |
| 2018/0234136 A1* | 8/2018 | Marinier | H04B 7/0636 |
| 2019/0254050 A1* | 8/2019 | Kusashima | H04W 24/00 |
| 2019/0297552 A1* | 9/2019 | Joseph | H04L 1/0009 |
| 2020/0112357 A1* | 4/2020 | Fakoorian | H04L 1/0009 |
| 2021/0092625 A1* | 3/2021 | Wang | H04L 41/0677 |
| 2021/0126753 A1* | 4/2021 | Mochizuki | H04W 72/1268 |
| 2021/0227513 A1* | 7/2021 | Takeda | H04W 72/0453 |
| 2022/0295544 A1* | 9/2022 | Wei | H04W 40/22 |

FOREIGN PATENT DOCUMENTS

CN  110622575 A  * 12/2019  ............. B41J 2/345

* cited by examiner

*Primary Examiner* — Kenny S Lin
*Assistant Examiner* — Rodrick Mak
(74) *Attorney, Agent, or Firm* — Jones Robb, PLLC (57) ABSTRACT

Systems and methods are provided for dynamically changing a channel state information (CSI) reporting protocol by adjusting CSI reporting frequency for a wireless device communicating with an access node within a wireless network. The methods and systems identify undesirable signal performance parameters at a particular wireless device and adjust the CSI reporting frequency when the undesirable signal performance parameters meet a predetermined threshold. The method changes the CSI reporting frequency for the wireless device to enable more frequent CSI reporting to the access node to facilitate reallocation of resources.

20 Claims, 7 Drawing Sheets

DYNAMIC ADJUSTMENT OF CHANNEL STATE INFORMATION REPORTING PROTOCOL

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Further, different types of access nodes may be implemented for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages. However, newer technologies may also have limited range in comparison to existing technologies.

To ensure consistent coverage through a wide geographic range, existing technologies such as 4G can be used in combination with newer technologies such as 5GNR. In an E-UTRAN New Radio-Dual Connectivity (EN-DC) configuration, wireless devices connect to an LTE eNodeB and 5G gNodeB. One node may act as a master node and the other as a secondary node. Thus, EN-DC allows devices to access both LTE and 5G simultaneously. In an EN-DC cell, more uplink noise or high received signal strength indicator (RSSI).

RSSI may exist because 5G UEs are connecting to both the LTE node and 5G node. With the LTE node functioning as a master node, it experiences higher interference on the uplink due to a larger number of UEs connecting to it. Access to high data speeds is improved if a high signal to interference and noise ratio (SINR) is present. Further, signal performance parameters such as RSSI, fading, and path loss may exist in varying degrees for wireless devices in various locations in the network. The signal performance parameters impact efficiency and performance for the wireless devices.

Accordingly, when signal performance parameters reach various levels at the wireless devices, the wireless devices are likely to experience a decrease in quality of service (QOS). In order to avoid prolonged decreases in QOS or other performance parameters, wireless devices send channel status information (CSI) reports to an access node in the network. The CSI report tells the access node how good or bad a channel is at a specific time. The CSI report may contain for example, a channel quality indicator (CQI), a precoding matrix index (PMI), and a rank indicator (RI), CSI-RS Resource Indicator (CRI), SS/PBCH Resource Block Indicator (SSBRI), and layer indicator (LI) as well as other measurements. Often, the wireless devices report in a periodic or aperiodic manner configured by a higher layer. For example, the reporting protocol may be configured through a setting at the eNodeB or gNodeB.

In response to CSI reports, a network entity can attempt to properly perform modulation coding scheme (MCS) assignment and allocate and schedule resources for each of the wireless devices to positively impact performance. The network entity considers the number of number of resource blocks and MCS for each CQI value to properly allocate the resources for each of the wireless devices.

Because signal performance parameters measured at the wireless devices vary, under certain undesirable conditions the devices may have a need for increased frequency of reporting to the network entity in order to benefit from resource reallocation. Accordingly, a system is needed that will dynamically alter the stored reporting protocol by increasing reporting frequency for adversely impacted wireless devices. Further, there is a need for systems and methods that can improve overall resource utilization, improve performance and decrease interference within sectors of a wireless network.

Overview

Exemplary embodiments described herein include systems, methods, and processing nodes for dynamically adjusting a CSI reporting protocol for a wireless device communicating with an access node within a wireless network. An exemplary method for dynamically adjusting the CSI reporting protocol for a wireless device operating in an EN-DC network includes dynamically identifying a signal performance parameter for the wireless device, comparing the signal performance parameter to a predetermined threshold and adjusting the CSI reporting frequency for the wireless device when the signal performance parameter meets the predetermined threshold.

Exemplary embodiments further include identifying the signal performance parameter on a first RAT to determine a first signal performance parameter and identifying the signal performance parameter on a second RAT to determine a second signal performance parameter and comparing the first and the second signal performance parameters to one or more predetermined thresholds to determine when the first and second signal performance parameters meet the predetermined threshold. Embodiments include adjusting the CSI reporting frequency for the wireless device over the first RAT when the first signal performance parameter meets the predetermined threshold and adjusting the CSI reporting frequency for the wireless device over the second RAT when the second signal performance parameter meets the predetermined threshold.

Exemplary embodiments further include a system for dynamically adjusting CSI reporting frequency for a wireless device communicating with an access node within a wireless network. The system includes a processing node and a processor coupled to the processing node configured to perform multiple operations. The operations include identifying a signal performance parameter for the wireless device, comparing the signal performance parameter to a predetermined threshold, and dynamically increasing CSI reporting frequency for the wireless device when the signal performance parameter meets the predetermined threshold.

Exemplary embodiments additionally include a processing node configured to perform multiple operations. The processing node dynamically identifies a signal performance parameter for a wireless device, determines that the signal performance parameter meets a predetermined threshold, and dynamically, in response to the determination, changing a CSI reporting frequency for the wireless device to enable more frequent CSI reporting from the wireless device to an access node.

DETAILED DESCRIPTION

Exemplary embodiments described herein include systems, methods, and processing nodes for dynamically adjusting a CSI reporting protocol. Embodiments operate in networks utilizing a 5G NR technology. Embodiments further encompass networks utilizing an EN-DC architecture, which allows devices to access both LTE and 5G simultaneously on the same spectrum band. Other network configurations are within scope of the disclosure.

In embodiments disclosed herein, a cell or wireless network may be provided by an access node. The access node may utilize one or more antennas to communicate with wireless devices or UEs. Performance at a particular wireless device may be dependent on a number of factors including, for example, antenna performance parameters and wireless device location within a cell or a sector. An evaluation of performance at each wireless device can be facilitating by examining signal performance parameters at the wireless device. Signal performance parameters may encompass, for example, received signal strength indicator (RSSI). RSSI is a measurement of how strong a signal coming from an access point or router is at the wireless device. The RSSI value can be pulled from a wireless device.

Other signal performance parameters, such as fading and path loss can also be considered. Path loss is the reduction in power density of signal as it travels from the access node to the wireless device and may be caused by factors such as free space loss, refraction, diffraction, reflection, or absorption. Path loss may also be influenced by terrain contours, environment, propagation medium, the distance between the transmitter and the receiver, and the height and location of antennas. Fading is a variation of signal attenuation with various variables, such as time, geographical position, and radio frequency. In wireless systems, fading may be due to multipath propagation, weather, or shadowing from obstacles affecting the wave propagation.

Wireless devices may send CSI reports to the access node so that the access node can respond by scheduling resources, reconfiguring MCS assignment, allocating quadrature amplitude modulation (QAM) or taking other appropriate action to improve performance. CSI reporting can be configured as periodic or aperiodic at the access node. Embodiments proposed herein dynamically alter the static setting at the access node such that a periodic setting may become aperiodic or the frequency of a periodic setting may be changed. Because certain levels of signal performance parameters can be indicative of poor performance, embodiments provided herein monitor the signal performance parameters and dynamically adjust CSI reporting frequency so that the access node can schedule resources and/or take other appropriate actions more frequently when performance is inadequate.

Some embodiments disclosed herein are particularly directed to dynamically adjusting CSI reporting for 5G EN-DC cells. Because 5G UEs are connecting to both an eNodeB and a gNodeB, the eNodeB experiences higher than normal levels of interference on the uplink because of the greater number of connected UEs. While dynamic adjustment of CSI reporting parameters aims to improve wireless device performance, the process of dynamic adjustment consumes resources such as physical resource blocks (PRBs) and also creates noise. The noise and the resources consumed by the process can be balanced with UE performance required. Thus, in order to avoid excessive consumption of resources and excessive noise, the dynamic adjustment process may be implemented only for UEs requiring high performance. Relay nodes are an example of UEs requiring high performance. Accordingly, embodiments disclosed herein determine if a UE is capable of functioning as a relay node before implementing the dynamic adjustment process. In other embodiments, in addition to relay nodes, 5G capable UEs may be evaluated as requiring a high level of performance. UEs running certain applications may also indicate that a high level of performance is required.

Additional measures for reducing PRB consumption and noise while improving wireless device performance may include limiting dynamic CSI reporting adjustment to a particular RAT. For example, the signal performance parameters for a wireless device may be evaluated for two RATs, for example, both a 4G RAT and a 5G RAT. The signal performance parameters for each RAT may be compared to one or more predetermined thresholds. Embodiments disclosed herein dynamically adjust the CSI reporting frequency for the wireless device over a particular RAT only when the signal performance parameters for the wireless device over that RAT meet the predetermined threshold. Thus, for a given wireless device, the CSI reporting frequency over one RAT may remain unchanged and the CSI reporting frequency over another RAT may be dynamically altered.

In exemplary embodiments, a processor or processing node associated with an access node may determine the signal performance parameter and dynamically adjust the CSI reporting protocol for one or more wireless devices when signal performance parameter meets a predetermined threshold. Accordingly, a solution as described herein alters the reporting protocol by increasing reporting frequency, thereby enabling more frequent resource scheduling or other response by the processor or processing node based on parameters included in the reporting to improve performance for one or more wireless devices. Embodiments disclosed herein further determine an existing CSI reporting periodicity for the wireless devices. If the reporting periodicity can be increased, the system dynamically instructs the wireless device to increase its CSI reporting periodicity when signal performance parameters meet a predetermined threshold.

As explained above, while the increased CSI reporting frequency can result in improved performance, the increased CSI reporting frequency also results in increased consumption of resource blocks and excessive noise. Therefore, in accordance with embodiments disclosed herein, methods and systems both dynamically increase and decrease reporting periodicity based on the signal performance parameters. For example, if the wireless device is a high performance wireless device, but the signal performance parameters no longer meet the threshold, embodiments of the invention decrease CSI reporting frequency. If the signal performance parameters meet the threshold, the CSI reporting frequency is increased. Once the system determines that the CSI reporting frequency can and should be changed, in embodiments disclosed herein, the system instructs the wireless device to change reporting frequency using a radio resource control (RRC) reconfiguration message.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a next generation NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamically adjusting the CSI reporting protocol may be implemented as computer-readable instructions or methods, and processing nodes on the network for executing the instructions or methods. The processing node may include a processor included in the access node or a processor included in any controller node in the wireless network that is coupled to the access node.

Figure 1:
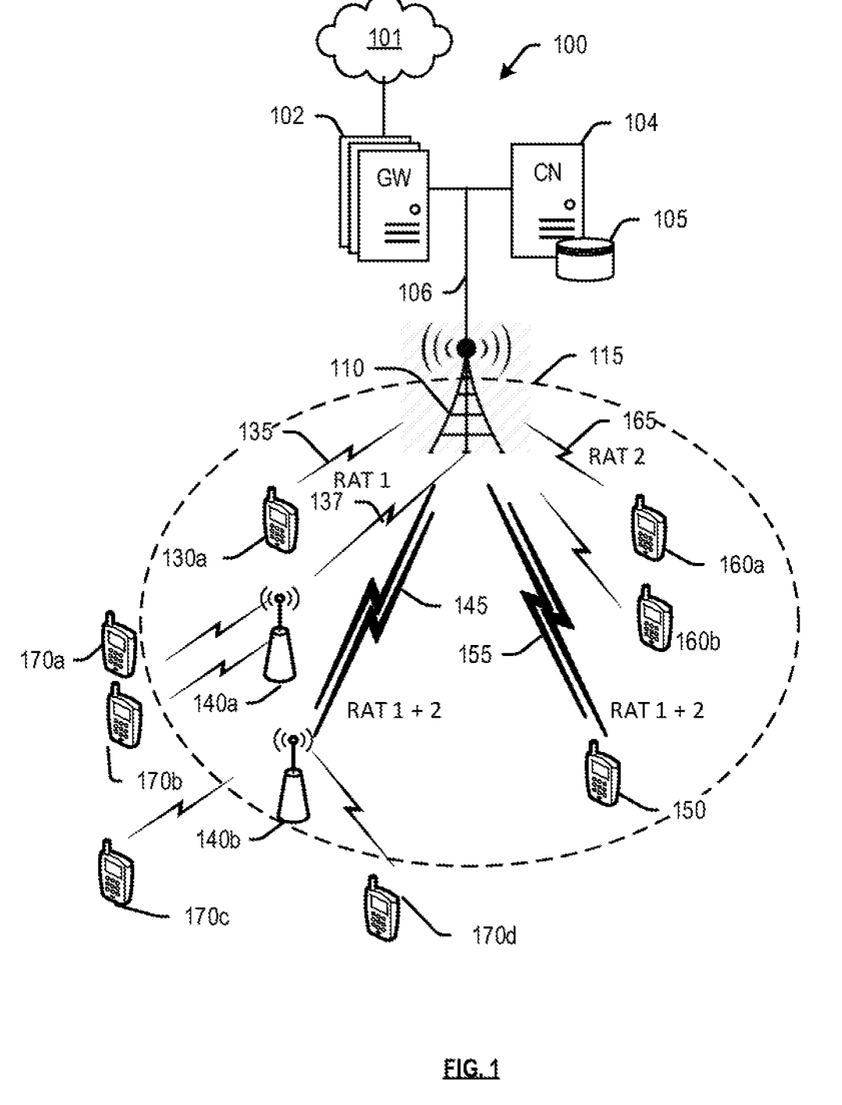
FIG. 1 depicts an exemplary system for wireless communication, in accordance with the disclosed embodiments.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130a, 150, 160a, and 160b and relay nodes 140a and 140b.

In this exemplary embodiment, access node 110 may be a macrocell access node configured to deploy at least two different carriers, each of which utilizes a different RAT. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 150, 160a, and 160b and relay nodes 140a and 140b are illustrated as being in communication with access node 110 over various types of communication links. Each of the end-user wireless devices 130a, 150, 160a, and 160b and relay nodes 140a and 140b may be attached to the wireless air interface deployed by access node 110. Wireless links 135 and 165, as well as other wireless links that directly couple end-user wireless devices with access node 110, as shown in FIG. 1, form the wireless network (or wireless radio air interface) deployed by access node 110 within coverage area 115.

In disclosed embodiments, wireless device 130a and relay node 140a are illustrated as being in communication with access node 110 using a first RAT, which may provide, for example an NR communications links 135 and 137. The NR communication links 135 and 137 may comprise any communication channel that utilizes air-interface resources of an NR carrier deployed by access node 110. Wireless devices 160a and 160b may be in communication with the access node 110 over a second RAT, which may be for example, an LTE communications link 165 provided by any LTE carrier connected to the access node 110. Further, wireless device 150 and relay node 140b are illustrated as being in communication with access node 110 over communication links 145 and 155 respectively. The communication links 145 and 155 utilize a carrier aggregation operating mode, i.e. they utilize wireless air interface resources from more than one carrier. For example, communication link 145 may utilize air-interface resources of at least one carrier utilizing the first RAT and at least another carrier, including any alternative carrier that in accordance with embodiments disclosed herein is using a second RAT and is connected with the access node 110. In embodiments an NR carrier is utilized as a primary carrier and at least on LTE carrier is utilized as a secondary carrier. Other configurations are within scope of the disclosure.

Access node 110 may be any network node configured to provide communication between end-user wireless devices 130a, 150, 160a, and 160b and relay nodes 140a and 140b and communication network 101, including standard access nodes such as a macro-cell access node, a base transceiver station, a radio base station, an eNodeB device, an enhanced eNodeB device, a next generation NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. Alternatively, access node 110 may comprise a short range, low power, small-cell access node such as a microcell access node, a picocell access node, a femtocell access node, or a home eNodeB device.

In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Relay nodes 140a and 140b may comprise any short range, low power, small-cell access nodes such as a microcell access node, a picocell access node, a femtocell access node, or a home eNodeB device. In addition, relay nodes 140a and 140b may comprise a small-cell access node paired with a relay wireless device configured to communicate over backhaul 135. Relay nodes 140a and 140b facilitate communication over the network with wireless devices 170a-170d.

Wireless networks incorporating access nodes, relay nodes, and other small-cell access nodes are becoming increasingly common. These may be referred to as heterogeneous networks. Relay nodes improve service quality by relaying communication between an access node, and end-user wireless devices in the wireless network. For example, relay nodes may be used at the edge of a coverage area of an access node to improve coverage and/or service. Relay nodes may also be used in crowded areas that have a high number of other wireless devices to increase the available throughput experienced by the wireless devices being relayed. Relay nodes are generally configured to communicate with the access node (i.e., a "donor" access node) via a wireless backhaul connection. Relay nodes typically deploy a radio air-interface to which end-user wireless devices can attach. Donor access nodes generally comprise scheduling modules that schedule resources used by wireless devices connected directly to the donor access node and also schedule the wireless backhaul connections for the various relay nodes connected thereto.

Wireless devices 130a, 150, 160a, 160b, and 170a-d may be any device, system, combination of devices, or other such communication platform capable of communicating wirelessly with access node 110 using one or more frequency bands and wireless carriers deployed therefrom. Each of wireless devices 130a, 150, 160a, 160b, and 170a-170d may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 150, 160a, and 160b. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, Ti, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include S1 communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE) or 5G NR and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. The controller node 104 may further operate as an element management system that controls access nodes in the network 101. In this instance, the element management system may be operable to measure performance metrics and interference within the network 101. One of ordinary skill in the art would recognize that controller node 104 is not limited to any specific technology architecture, such as Long Term Evolution (LTE) or 5G NR and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and carrier aggregation capabilities of wireless devices 130a, 150, 160a, and 160b associations there between. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Further, a scheduling entity (within, for example access node 110 or controller node 104) may be configured to improve wireless device performance by responding to more frequent CSI reporting by the wireless devices in order to allocate resources more efficiently. For example, in a 5G network, if signal performance parameters are considered to indicate inadequate performance, if a wireless device is conducting CSI reporting every 30 ms, the access nodes 110 may instruct the wireless device to increase reporting periodicity to conduct CSI reporting every 15 ms. In response to the reports, the access nodes may assign resources towards the wireless devices in an appropriate manner to maximize performance. In embodiments disclosed herein, access node 110 may comprise logic for performing operations including locating wireless devices requiring high performance, determining a signal performance parameter value, comparing the signal performance parameter value to a predetermined threshold, and adjusting CSI reporting frequency when the signal performance parameter meets the threshold.

In an exemplary embodiment, controller node 104 includes a database 105 for storing information, such as various thresholds for signal performance parameters, maximum and minimum CSI reporting frequencies, scheduling schemes and resource allocations for each of access node 110 and wireless devices connected thereto, and so on. This information may be requested by or shared with access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 2:
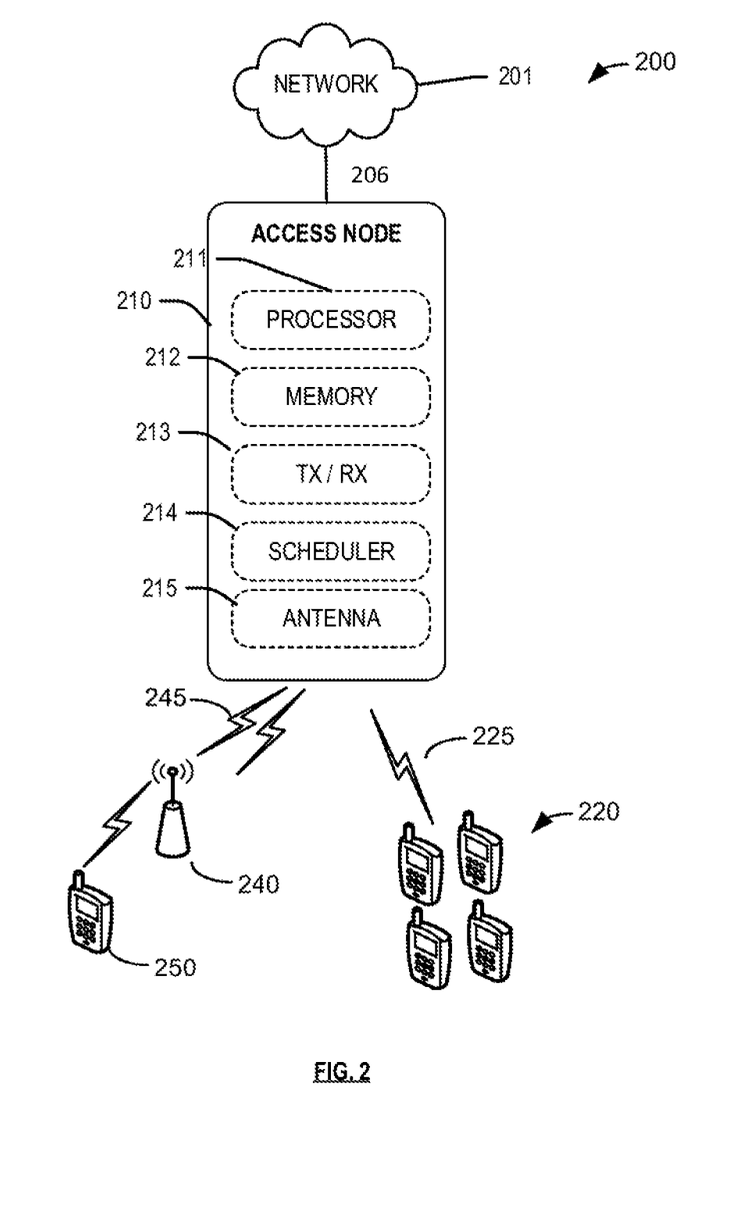
FIG. 2 illustrates an exemplary configuration of an access node.

FIG. 2 illustrates an exemplary communication system configured to communicate with a relay node. Communication system 200 comprises network 201, access node 210, end-user wireless devices 220 and 250, and relay node 240. Access node 210 may comprise, for example, a macro-cell access node, such as access node 110 described with reference to FIG. 1. Access node 210 is illustrated as comprising a processor 211, memory 212, transceiver 213, scheduler 214, and antenna 215. Processor 211 executes instructions stored on memory 212, while transceiver 213 and antenna 215 enable wireless communication with wireless devices 220 and relay node 240. Instructions stored on memory 212 can include deploying a wireless air interface via combination of transceiver 213 and antenna 215, enabling wireless devices 220 and relay node 240 to access network services from network 201 via access node 210, and to communicate with end-user wireless device 250 via relay node 240. Thus, access node 210 may be referred to as a donor access node.

Access node 210 may further be configured to identify relay node 240 as being connected thereto, determine a configuration thereof, and schedule resources towards backhauls 225 and 235 based thereon. For example, the access node 210 may identify the relay node as a node 240 as a node requiring high performance and assess an optimal reporting frequency based on the high performance requirements.

For example, access node 210 may be configured to detect signal performance parameters, compare the parameters to a predetermined threshold, and adjust a CSI reporting protocol accordingly. Scheduler 214 may be provided for scheduling resources based on received CSI reports. These features may be enabled by access node 210 comprising two co-located cells, or antenna/transceiver combinations that are mounted on the same structure. Network 201 may be similar to network 101 discussed above. Carrier aggregation mode, during which a wireless device utilizes more than one carrier, enables the wireless devices to communicate with access node 210 using a combination of resources from multiple carriers.

Figure 3:
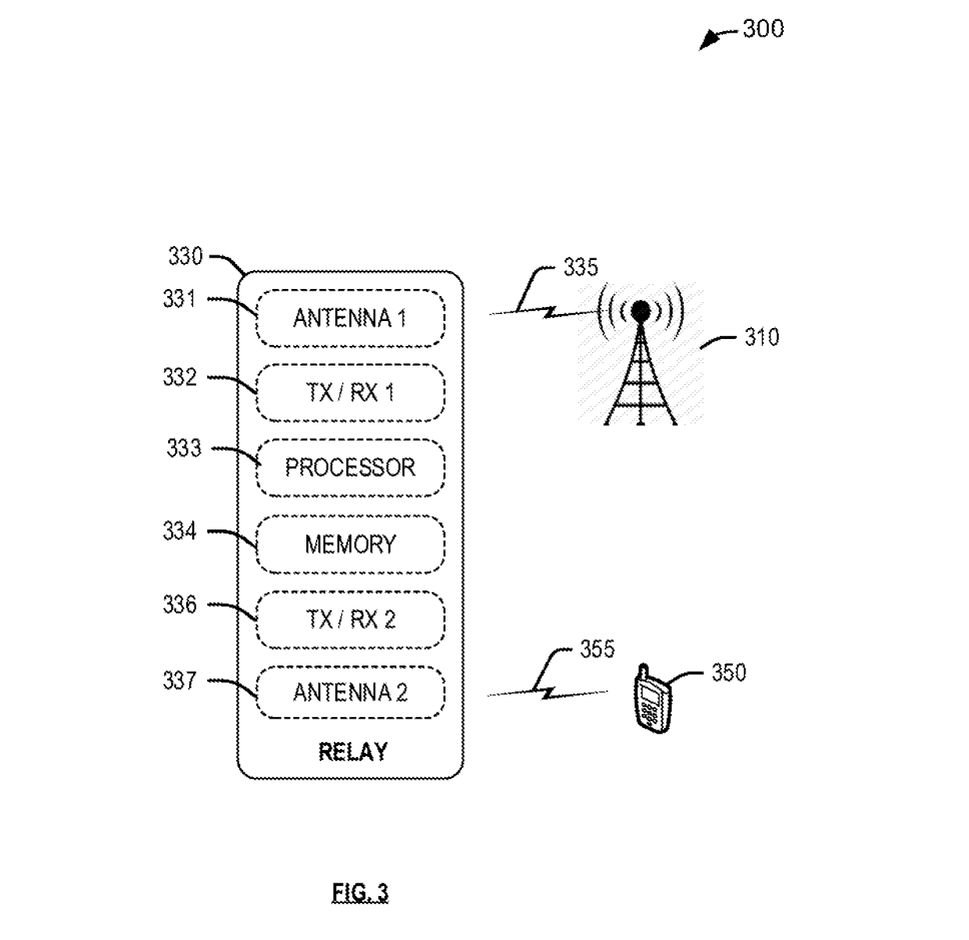
FIG. 3 is a diagram illustrating a relay node in accordance with the disclosed embodiments.

FIG. 3 illustrates an example relay node 340. In FIG. 3, relay node 340 comprises a first antenna 331, first transceiver 332, processor 333, memory 334, second transceiver 336, and a second antenna 337. Memory 334 may be used for storing instructions that are executed by processor 333. Transceiver 332 and antenna 331 may be used for direct (i.e. unrelayed) communication with donor access node 310 via wireless backhaul link 335. Relay node 340 includes transceiver 336 and antenna 337 for enabling communication with wireless device 350 via link 355 thereby enabling wireless device 350 to attach thereto. When relay node 340 is attached to access node 310, and wireless device 350 is attached to relay node 340, communication system 300 is formed.

Relay node 340 may be configured to identify itself as a relay node to access node 310. Relay node may be configured to receive instructions and resource allocations from access node 310. Relay node 340 may report or otherwise communicate to access node 310 signal performance parameters such as RSSI, fading, or path loss or other quality of service indicators associated with the devices attached to relay node 340.

Further, instructions stored on memories 212 and/or memory 334 can include instructions for dynamically adjusting CSI reporting frequency, which will be further explained below with reference to FIGS. 4-7. The instructions may facilitate monitoring at least one signal performance parameter of wireless devices and comparing the monitored values with stored metrics or stored predetermined thresholds. If the monitored values are outside of predetermined boundaries, the instructions may dictate dynamically adjusting a CSI reporting protocol per wireless device.

Figure 4:
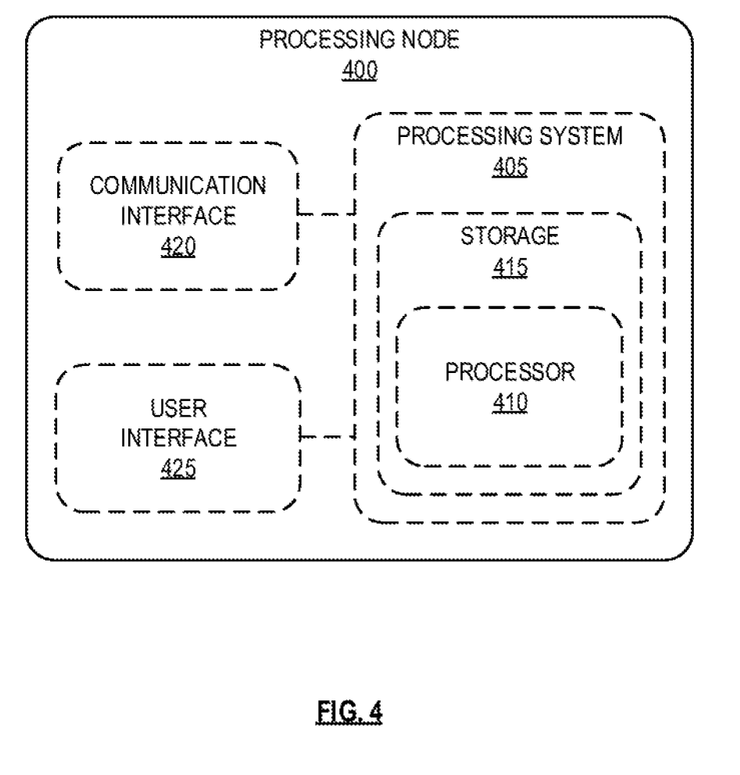
FIG. 4 depicts a processing node in accordance with disclosed embodiments.

FIG. 4 depicts an exemplary processing node 400, which may be configured to perform the methods and operations disclosed herein dynamically adjusting a CSI reporting protocol in order to improve performance in a wireless network. In some embodiments, processing node 400 may be included in an access node, such as access node 110, 210, or 310. In further embodiments, processing node 400 may be included in controller node 104 and may be configured for controlling the access nodes.

Processing node 400 may be configured for dynamically adjusting the CSI reporting protocol in the network as set forth above. The adjustment of CSI reporting protocol may be performed dynamically in real time based on a threshold comparison in a network, such as the network 101. Processing node 400 may include a processing system 405. Processing system 405 may include a processor 410 and a storage device 415. Storage device 415 may include a disk drive, a flash drive, a memory, or other storage device configured to store data and/or computer readable instructions or codes (e.g., software). The computer executable instructions or codes maybe accessed and executed by processor 410 to perform various methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

Figure 5:
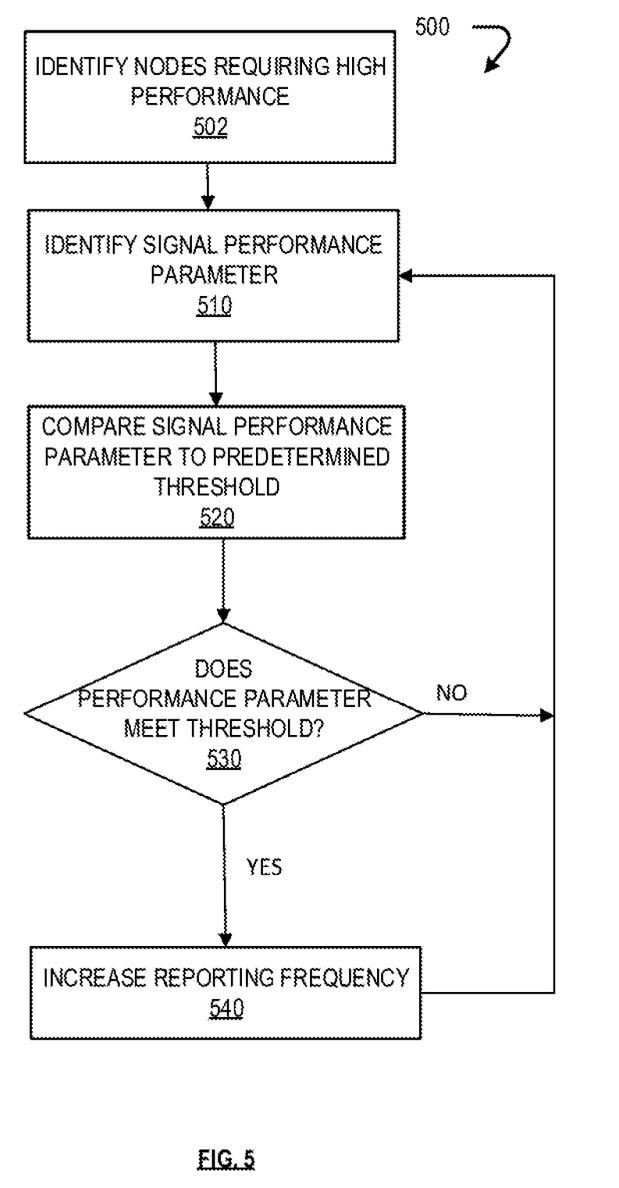
FIG. 5 depicts a method for dynamically adjusting a CSI reporting protocol in accordance with the disclosed embodiments.

The disclosed methods for dynamically adjusting the CSI reporting protocol are discussed further below. FIG. 5 illustrates an exemplary method 500 for dynamically adjusting the CSI reporting protocol for a wireless device in a network. Method 500 may be performed by any suitable processor discussed herein, for example, a processor included in access node 110, 210, 310 or processor 410, included in processing node 400, or a processor included in controller node 104. For discussion purposes, as an example, method 500 is described as being performed by a processor included in access node 110.

Method 500 starts in step 502 and the access node 110 may identify wireless devices or UEs requiring high performance. The identified UEs may include, for example, relay nodes, 5G capable devices, or devices running particular applications that provide high performance. Relays require high performance because they serve as a backhaul for small cells that are supporting a number of 4G or 5G wireless devices. The access node performs step 502 in order to avoid performing the remaining method steps for all wireless device in the network. Due to limited resources and more noise created by increasing reporting frequency, it may be desirable to limit the remaining method steps to operate specifically for wireless devices requiring high performance. The access node 110 may identify the wireless devices requiring high performance based on reports sent by the wireless devices to the access node or based on information stored in a database available to the access node.

In step 510, the access node 110 may identify signal performance parameters for the wireless devices requiring high performance. As explained above, the access node 110 may identify signal performance parameters such RSSI, fading, or path loss at the wireless device requiring high performance. These signal performance parameters may be measured by the wireless devices and may be reported from the wireless devices to the access node 110. In some instances, performance parameters may be measured by the access node and stored in a database.

In step 520, the access node 110 compares the identified signal performance parameter to a predetermined threshold. For example, a threshold may be selected for RSSI based on an expected drop in wireless performance at the threshold level. If RSSI meets a certain threshold level, then the expected performance for the wireless device may be deemed insufficient. With respect to fading and path loss, values meeting and exceeding a certain level are also expected to lead to an unacceptable performance for the wireless device.

In step 530, the access node 110 determines whether the signal performance parameter meets the predetermined threshold. For example, the RSSI, path loss and fading parameters may meet the predetermined threshold if the signal parameter value equals or is above the predetermined threshold.

If the signal performance parameter does not meet the predetermined threshold in step 530, the access node continues to monitor signal performance parameters in step 510. However, if the signal performance parameter meets the predetermined threshold in step 530, the access node 110 may alter the CSI reporting protocol by increasing the CSI reporting frequency for the wireless device in step 540. The access node may send a message to the wireless device directing it to report more frequently. For example, the access node may direct the wireless device to send a CSI reporting message or updated CSI reporting more frequently than previously. If impacted wireless device had been sending every 40 ms, then the access node 110 may direct the wireless device to increase reporting to every 25 ms or 30 ms. The increased reporting for high performance UEs such as relays enables the access node to make better decisions regarding MCS assignment and QAM allocation, to improve overall network performance.

Additionally, because the adjustment to the CSI reporting protocol occurs dynamically, the method can transform a periodic reporting scheme to an aperiodic reporting scheme based on the monitored signal performance parameters.

Figure 6:
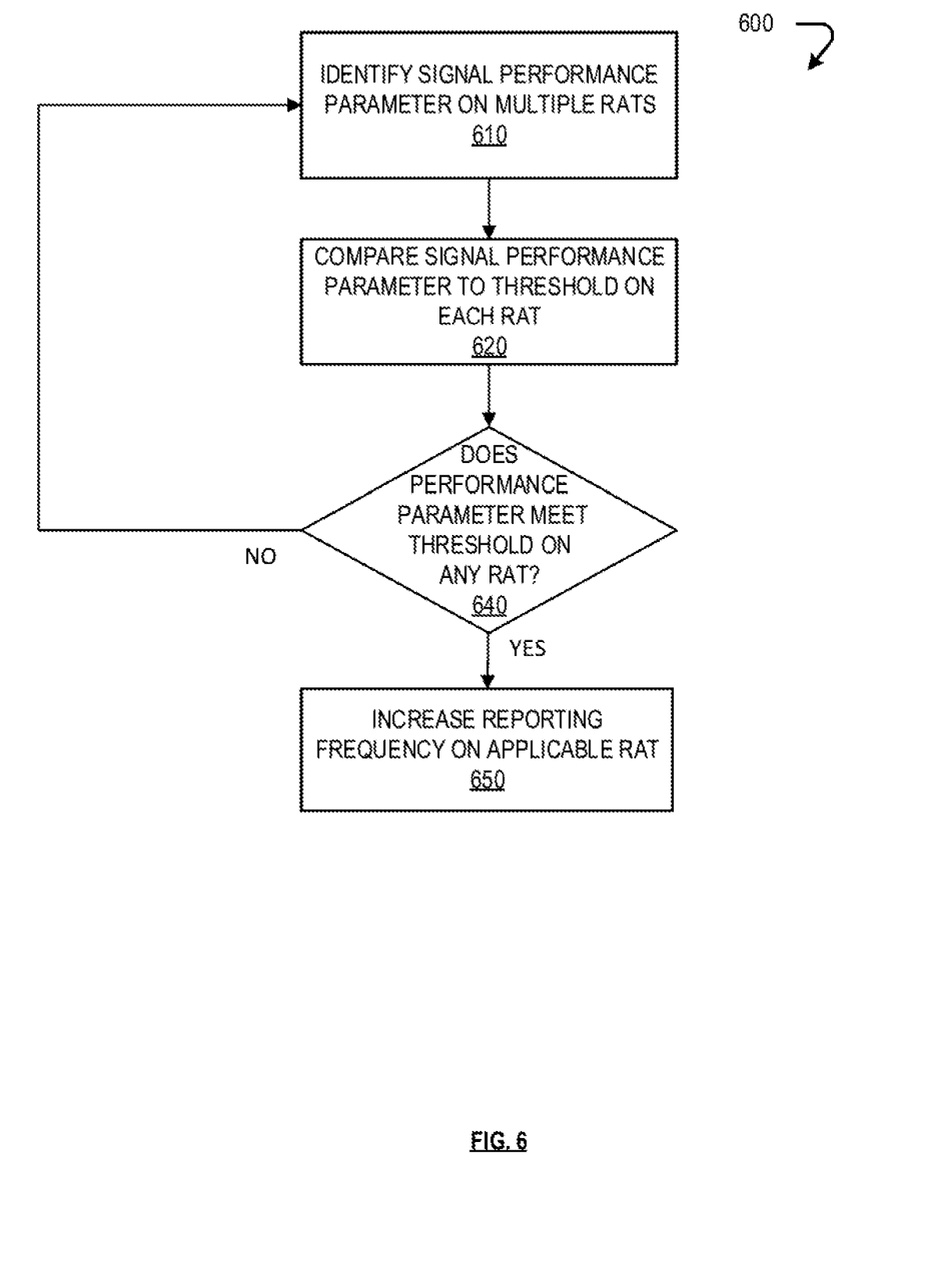
FIG. 6 depicts an exemplary method for dynamically adjusting a CSI reporting protocol for multiple RATs.

FIG. 6 depicts an exemplary method 600 for dynamically adjusting the CSI reporting protocol for wireless devices communicating over multiple RATs. Method 600 may be performed by any suitable processor discussed herein, for example, a processor included in access node 110, 210, or 310 or processor 410 included in processing node 400, or a processor included in controller node 104. For discussion purposes, as an example, method 600 is described as being performed by a processor included in access node 110.

In step 610, the access node 110 identifies a signal performance parameter on multiple RATs for a wireless device. The wireless device may communicate for example over both a 4G and a 5G RAT. Therefore, the access node identifies the signal performance parameter, for example, fading or path loss, over both the 4G and 5G RATs. This information is readily available over a period of time on a specific enodeB or gnodeB for a specific UE or wireless device in a given location.

In step 620, the access node 110 determines if the signal performance parameter meets a predetermined threshold. The predetermined threshold may include two different thresholds including a first threshold for a first RAT and a second threshold for a second RAT. Alternatively, the thresholds for the two RATs may be the same.

If the fading or path loss over either RAT equals or exceeds the predetermined threshold in step 640, the access node may increase reporting frequency on the applicable RAT in step 650. Thus, the method aims to provide dynamic CSI reporting, particularly in an EN-DC 5G NR cell. Reporting for each RAT would be independent of other RAT and is based on a signal performance parameter experienced in the system, e.g., fading or path loss. Typically reporting over the 5G RAT will become more frequent than reporting over the 4G RAT and reporting will become more frequent for UEs or wireless devices experiencing path loss or fading. If UE is in EN-DC configuration and only one RAT (e.g., 5G) is experiencing fading and the other (e.g. 4G) is not, CSI reporting would be more frequent on 5G than on 4G for the same UE. Thus, for example, a single wireless device may perform CSI reporting every 40 ms on the 4G RAT and every 20 ms on the 5G RAT.

Figure 7:
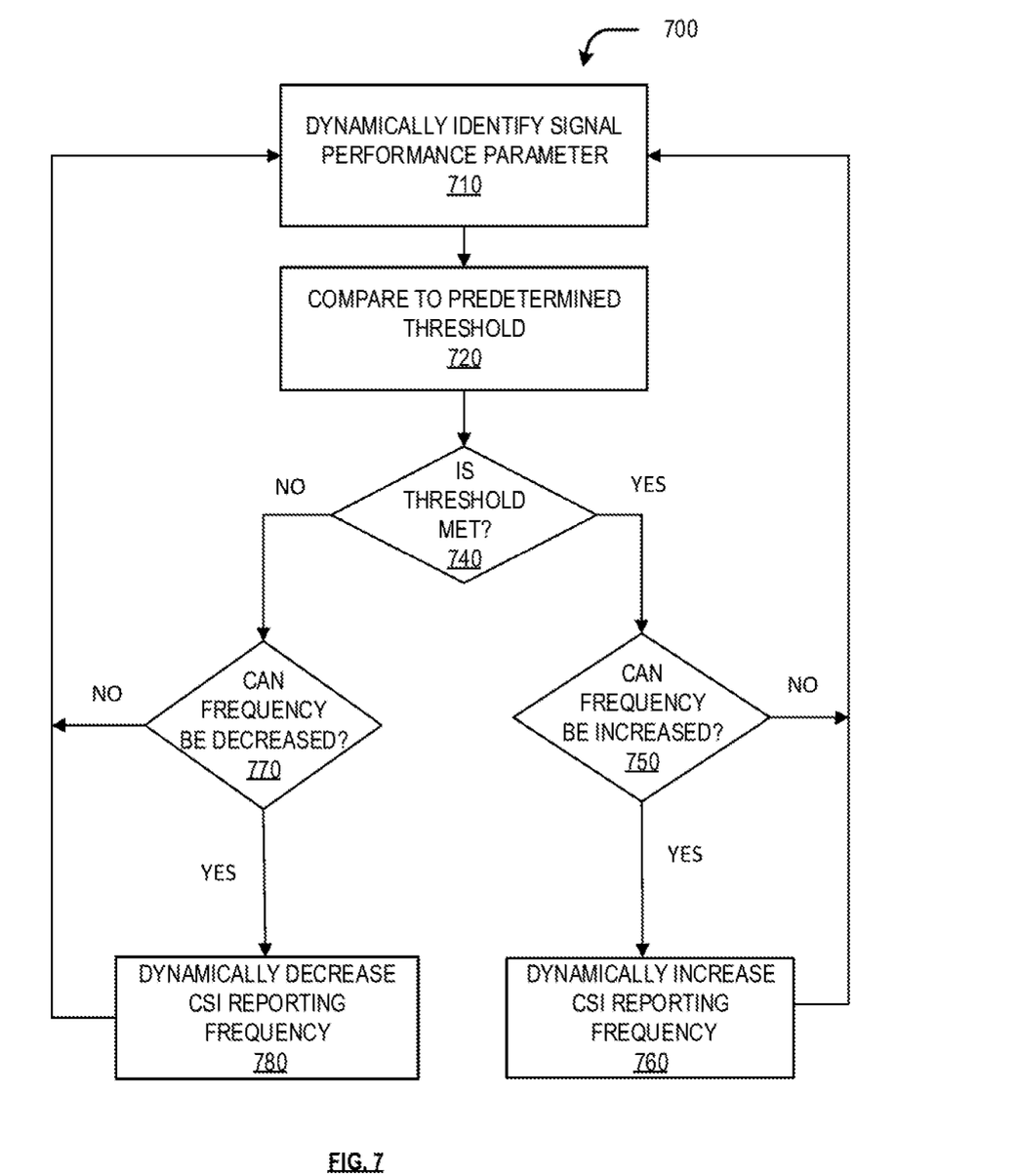
FIG. 7 depicts another exemplary method for dynamically adjusting a CSI reporting protocol.

FIG. 7 illustrates a method 700 for dynamically adjusting the CSI reporting protocol for a wireless device in a network. Method 700 may be performed by any suitable processor discussed herein, for example, a processor included in access node 110, 210, or 310 or processor 410 included in processing node 400, or a processor included in controller node 104. For discussion purposes, as an example, method 600 is described as being performed by a processor included in access node 110.

In step 710, the access node 110 dynamically identifies a signal performance parameter for a particular wireless device. The signal performance parameter may be or include RSSI, fading, path loss, or another signal performance parameter. In step 720, the access node 110 compares the identified signal performance parameter to a predetermined threshold. In step 740, the method includes determining whether the identified signal performance parameter meets the predetermined threshold.

If the threshold is met in step 740, the access node determines if the CSI reporting frequency can be increased in step 750. This determination may include comparing the existing CSI reporting frequency to a stored maximum CSI reporting frequency. The existing reporting frequency may be stored in a database or table at the access node. Minimum and maximum reporting frequencies may also be set at the access node and stored in a database. To determine if the CSI reporting frequency can be increased, the access node can compare the existing frequency with the maximum frequency stored in the database. If the CSI reporting frequency can be increased in step 750, the access node increases the reporting frequency in step 760. The increase in reporting frequency of the wireless device with signal performance parameters meeting the threshold enables more frequent reallocation of resources in order to enhance performance of the wireless device. In order to increase the reporting frequency, the access node may instruct the wireless device with the undesirable performance parameters to increase its CSI reporting frequency through an RRC reconfiguration message or other message directed specifically to the wireless device. The access node continues to monitor the signal performance parameters wireless devices in the network in step 710.

If the threshold is not met in step 740, the method may determine if the CSI reporting frequency can be decreased in step 770. This determination can be made, for example, by comparing the existing CSI reporting frequency to a stored predetermined minimum CSI reporting frequency. If the frequency can be decreased, the access node directs the wireless device to decrease CSI reporting frequency in step 780. If the frequency cannot be decreased, the access node returns to dynamically identifying signal performance parameters in step 710.

While the method of FIGS. 5 and 6 aim to dynamically increase CSI reporting frequency for a wireless device having undesirable signal performance parameters, the method of FIG. 7 illustrates the process of dynamically adjusting the CSI reporting frequency in both directions. Because increased reporting frequency consumes resources it may be desirable to lower the frequency of reporting when a wireless device no longer experiences undesirable signal performance parameters. Dynamically decreasing the reporting frequency will allow effective and efficient distribution of network resources when signal parameters fall within acceptable ranges.

In some embodiments, methods 500, 600, and 700 may include additional steps or operations. Furthermore, the methods may include steps shown in each of the other methods. As one of ordinary skill in the art would understand, the methods 600, 700, and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically adjusting a channel state information (CSI) reporting protocol for a wireless device operating in a wireless network utilizing two radio access technologies (RATs), the method comprising,
    dynamically identifying a first signal performance parameter for the wireless device on a first RAT of the two RATs;
    dynamically identifying a second signal performance parameter for the wireless device on a second RAT of the two RATs;
    comparing the first signal performance parameter to a first predetermined threshold;
    comparing the second signal performance parameter to a second predetermined threshold;
    determining that the first signal performance parameter meets the first predetermined threshold and that the second signal performance parameter does not meet the second predetermined threshold;
    determining that the wireless device is a high-performance device, wherein the high-performance device includes one or more of a relay node or a 5G-capable device; and
    in response to determining that the wireless device is a high-performance device and that the first signal performance parameter meets the first predetermined threshold, adjusting the CSI reporting protocol by increasing CSI reporting frequency for the wireless device over the first RAT, wherein the CSI reporting frequency over the first RAT is independent of and is greater than a CSI reporting frequency for the wireless device over the second RAT.

2. The method of claim 1, wherein identifying the first signal performance parameter or the second signal performance parameter comprises identifying a received signal strength indicator (RSSI).

3. The method of claim 1, wherein identifying the first signal performance parameter or the second signal performance parameter comprises identifying a fading measurement.

4. The method of claim 1, wherein identifying the first signal performance parameter or the second signal performance parameter comprises identifying a path loss measurement.

5. The method of claim 1, wherein the wireless device is a relay node.

6. A system for dynamically changing a channel state information (CSI) reporting protocol for a wireless device communicating with an access node within a wireless network utilizing two radio access technologies (RATs), the system comprising:
    a processing node; and
    a processor coupled to the processing node configured to perform operations comprising:
    identifying a first signal performance parameter for the wireless device on a first RAT of the two RATs;
    identifying a second signal performance parameter for the wireless device on a second RAT of the two RATs;
    comparing the first signal performance parameter to a first predetermined threshold;
    comparing the second signal performance parameter to a second predetermined threshold;
    determining that the first signal performance parameter meets the first predetermined threshold and that the second signal performance parameter does not meet the second predetermined threshold;
    determining that the wireless device is a high-performance device, wherein said high-performance device includes one or more of a relay node or a 5G-capable device; and
    in response to determining that the wireless device is a high-performance device and that the first signal performance parameter meets the first predetermined threshold, dynamically changing the CSI reporting protocol by increasing CSI reporting frequency for the wireless device over the first RAT, wherein the CSI reporting frequency over the first RAT is independent of and is greater than a CSI reporting frequency for the wireless device over the second RAT.

7. The system of claim 6, wherein the first signal performance parameter or the second signal performance parameter is a received signal strength indicator (RSSI).

8. The system of claim 6, wherein the wireless device is a relay node.

9. The system of claim 6, wherein the first signal performance parameter or the second signal performance parameter is one of a fading measurement and a path loss measurement.

10. A processing node configured to perform operations comprising:
- dynamically identifying a first signal performance parameter for a wireless device operating in a wireless network utilizing two radio access technologies (RATs), the first signal performance parameter being associated with a first RAT of the two RATs;
- dynamically identifying a second signal performance parameter for the wireless device, the second signal performance parameter being associated with a second RAT of the two RATs;
- determining that the first signal performance parameter meets a first predetermined threshold or that the second signal performance parameter meets a second predetermined threshold;
- determining that the first signal performance parameter meets the first predetermined threshold and that the second signal performance parameter does not meet the second predetermined threshold;
- determining that the wireless device is a high-performance device, wherein said high-performance device includes one or more of a relay node or a 5G-capable device; and
- in response to determining that the wireless device is a high-performance device, dynamically, in response to determining the first signal performance parameter meets the first predetermined threshold, changing a CSI reporting frequency for the wireless device over the first RAT to enable more frequent CSI reporting from the wireless device to an access node, wherein the CSI reporting frequency over the first RAT is independent of and is greater than a CSI reporting frequency for the wireless device over the second RAT.

11. The processing node of claim 10, wherein the signal performance parameter is one of a fading measurement and a path loss measurement.

12. The method of claim 1, wherein increasing CSI reporting frequency for the wireless device over the first RAT comprises comparing the CSI reporting frequency over the first RAT of the wireless device to a stored maximum CSI reporting frequency and determining the CSI reporting frequency over the first RAT is less than the stored maximum CSI reporting frequency and can be increased.

13. The system of claim 6, wherein the system is further configured to increase the CSI reporting frequency for the wireless device over the first RAT after comparing the CSI reporting frequency over the first RAT of the wireless device to a stored maximum CSI reporting frequency and determining the CSI reporting frequency over the first RAT is less than the stored maximum CSI reporting frequency and can be increased.

14. The processing node of claim 10, wherein the processing node is further configured to enable a CSI reporting frequency for the wireless device over the first RAT greater than a CSI reporting frequency for the wireless device over the second RAT after comparing the CSI reporting frequency over the first RAT of the wireless device to a stored maximum CSI reporting frequency and determining the CSI reporting frequency over the first RAT is less than the stored maximum CSI reporting frequency and can be increased.

15. The method of claim 1, wherein determining that the wireless device is a high-performance device comprises determining that the wireless device is a relay node.

16. The method of claim 1, wherein determining that the wireless device is a high-performance device comprises determining that the wireless device is 5G capable.

17. The system of claim 6, wherein determining that the wireless device is a high-performance device comprises determining that the wireless device is a relay node.

18. The system of claim 6, wherein determining that the wireless device is a high-performance device comprises determining that the wireless device is 5G capable.

19. The processing node of claim 10, wherein determining that the wireless device is a high-performance device comprises determining that the wireless device is a relay node.

20. The processing node of claim 10, wherein determining that the wireless device is a high-performance device comprises determining that the wireless device is 5G capable.

\* \* \* \* \*